United States Patent
Roberts et al.

(10) Patent No.: US 6,820,276 B2
(45) Date of Patent: Nov. 16, 2004

(54) DISK CARTRIDGE WITH SHUTTER KEEPER MOLDED AS ONE PIECE WITH HOUSING

(75) Inventors: Gregory D. Roberts, Breckenridge, MN (US); Gregg C. Hagen, Wahpeton, ND (US)

(73) Assignee: Imation Corp., Oakdale, MN (US)

( * ) Notice: Subject to any disclaimer, the term of this patent is extended or adjusted under 35 U.S.C. 154(b) by 173 days.

(21) Appl. No.: 10/112,544

(22) Filed: Mar. 28, 2002

(65) Prior Publication Data

US 2003/0185145 A1 Oct. 2, 2003

(51) Int. Cl.[7] .............................................. G11B 7/26
(52) U.S. Cl. ...................................................... 720/738
(58) Field of Search .......................... 360/133; 369/291

(56) References Cited

U.S. PATENT DOCUMENTS

| | | | |
|---|---|---|---|
| 4,945,530 A | * 7/1990 | Sandell et al. | 369/291 |
| 5,325,257 A | * 6/1994 | Akiyama et al. | 360/133 |
| 5,406,547 A | 4/1995 | Akiyama et al. | |
| 5,717,684 A | 2/1998 | Akiyama et al. | |
| 5,822,297 A | 10/1998 | Fujisawa | |
| 5,903,542 A | * 5/1999 | Sandell et al. | 369/291 |
| 6,094,326 A | * 7/2000 | Ikebe et al. | 360/133 |
| 6,118,757 A | * 9/2000 | Olsen et al. | 369/291 |

FOREIGN PATENT DOCUMENTS

| | | |
|---|---|---|
| WO | WO 00/72312 A2 | 11/2000 |
| WO | WO 01/80243 A2 | 10/2001 |
| WO | WO 01/80244 A2 | 10/2001 |

* cited by examiner

Primary Examiner—David Ometz
Assistant Examiner—Mark Blouin
(74) Attorney, Agent, or Firm—Eric D. Levinson (57) ABSTRACT

A cartridge assembly for a data storage disk includes a housing for containing the data storage disk. The housing defines an opening for exposing at least a portion of the data storage disk. A shutter is supported by the housing, the shutter being movable between open and closed positions for uncovering the opening in the housing and covering the opening in the housing. A shutter keeper is formed as one-piece with the housing, for covering at least a portion of the shutter to retain the shutter with respect to the housing. A method of making a cartridge assembly for a data storage disk includes molding a cartridge shell, the molded cartridge shell being one-piece with an outwardly projecting keeper, placing a shutter in association with the cartridge shell, the shutter being slidable between open and closed positions for exposing and covering at least a portion of the data storage disk, and moving the keeper over at least a portion of the shutter to retain the shutter in association with the cartridge shell.

20 Claims, 5 Drawing Sheets

DISK CARTRIDGE WITH SHUTTER KEEPER MOLDED AS ONE PIECE WITH HOUSING

BACKGROUND OF THE INVENTION

Embodiments of the invention relate to a cartridge assembly for a data storage disk, and methods of making a cartridge assembly for a data storage disk. More particularly, embodiments of the invention relate to such cartridge assemblies having a housing and a movable shutter for uncovering an opening in the housing to expose at least a portion of the data storage disk.

Removable storage media have become universally accepted for storing data. Desktop, laptop and handheld computing devices, digital cameras, digital music players, and other electronic devices commonly use such media to read, store and/or transfer data. Advances in technology are greatly reducing the size of such media while at the same time increasing their storage capacity.

One known type of digital storage media holds up to 500 MB of data, with higher capacities contemplated, but is merely the size of a small coin. Universal media format promulgated by DataPlay, Inc. of Boulder, Colo. is designed to play and record multiple types of content on a single disk: music, images, books, games, computer files, and cellular phone numbers, to name a few examples. Such media enables access to all forms of digital content across all digital devices and platforms, including music, images, documents, software, games, video, and more. One 500 MB digital media can hold more than 11 hours of music downloads or five complete pre-recorded albums of CD-quality music, hundreds of high-resolution photographs, or dozens of games, for example. Any properly enabled computer or other device can read and play back such content.

Figure 1:
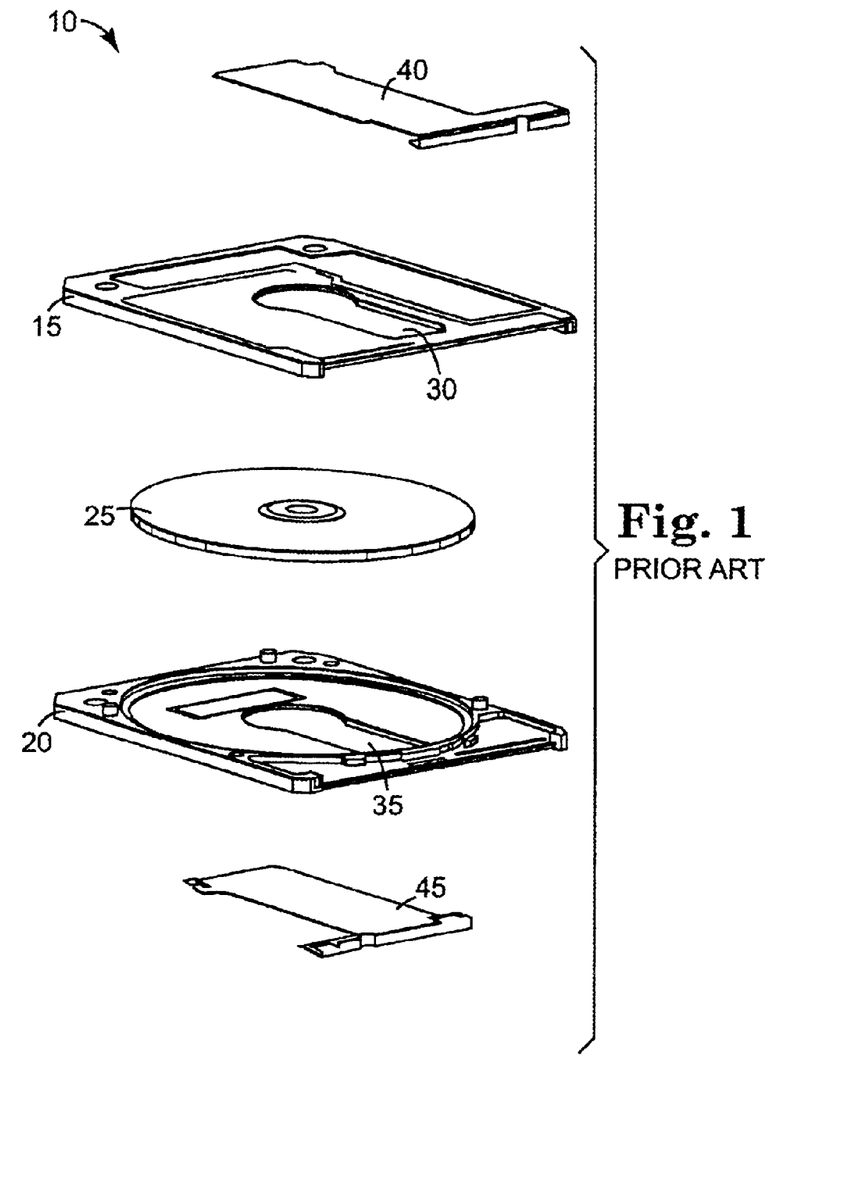
FIG. 1 is an exploded, perspective view of a conventional data cartridge.
Figure 2:
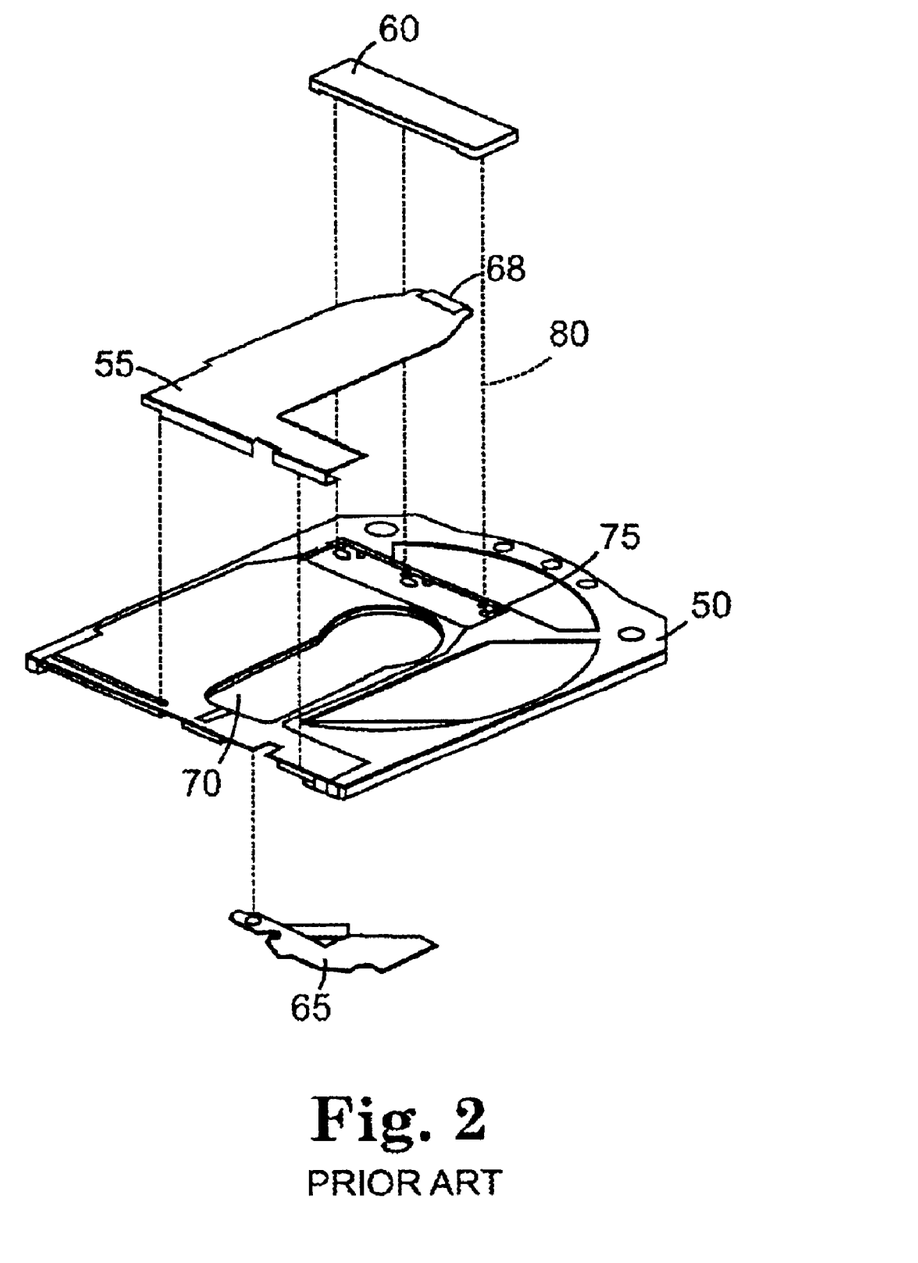
FIG. 2 is an exploded, perspective view of a portion of a conventional data cartridge.

As shown in the exploded views of FIGS. 1–2, conventional data cartridge 10 includes upper and lower housing members 15, 20 that surround information-containing medium 25. Windows 30, 35 in housing members 15, 20, respectively, are covered by respective first and second "L"-shaped shutter members 40, 45. When cartridge 10 is inserted into an associated drive, an appropriate mechanism within the drive moves shutter members 40, 45 laterally such that an optical head or other mechanism can read from or write to medium 25 through windows 30, 35. As shown in FIG. 2, an alternative upper housing member 50 supports shutter member 55, shutter cover 60 and locking nub 65. Shutter cover 60 covers tab 68 of shutter 55 during side-to-side movement of shutter 55 for covering and uncovering window 70 in upper housing member 50. Attention is directed to, e.g., World Intellectual Property Organization International Publication Nos. WO 01/80243 A2, published Oct. 25, 2001, WO 01/80244 A2, published Oct. 25, 2001, and WO 00/72312 A2, published Nov. 30, 2000, for example, for additional detail.

Shutter cover 60 is manufactured separately from housing member 50. Shutter cover 60 typically is a very small part that can be difficult to locate, orient and place, especially in an automated manufacturing environment. Shutter cover 60 also is a very lightweight part, making it very difficult to adequately separate from other parts in a vibratory-type bowl feeder, for example. Further, housing member 50 can be manufactured in a number of different colors, likewise requiring that shutter cover 60 also be manufactured in a number of different colors. This possible color variation of shutter cover 60 creates additional difficulties from an inventory standpoint as well as an assembly standpoint. According to typical assembly methods, molds also have to be swapped in and out for manufacturing runs of the two different pieces, i.e. shutter cover 60 and housing member 50.

Once a proper shutter cover 60 is matched to a particular housing member 50 and picked up by a pick-and-place device in an automated assembly environment, the device must correctly orient and then accurately place the shutter cover 60 on housing member 50. Glue must be placed carefully on shutter cover 60, for example, glue reservoirs being provided to accommodate excess. Additionally, shutter cover 60 includes posts or protrusions for careful insertion into corresponding recesses 75 in housing member 50, as represented by dashed lines 80, for example. Once accurately placed, a pressurized fixture or the like is placed on top of shutter cover 60 to hold it in place while the glue sets and/or while the assembly is run through one or more securing stations.

Picking up, orienting, and placing shutter cover 60, as well as applying glue, can be a relatively complicated endeavor. Thus, use of one or more separate shutter covers 60 increases operational complexity, increases cycle time, and increases associated cost.

SUMMARY OF THE INVENTION

One aspect of the present invention relates to a cartridge assembly for a data storage disk, the cartridge assembly including a housing for containing the data storage disk, a shutter supported by the housing, and a shutter keeper. The housing defines an opening for exposing at least a portion of the data storage disk. The shutter is movable between an open position for uncovering the opening in the housing to expose at least a portion of the data storage disk, and a closed position for covering the opening in the housing. The shutter keeper is formed as one-piece with the housing, for covering at least a portion of the shutter to retain the shutter with respect to the housing. The shutter keeper can be molded as one-piece with the housing. The shutter keeper is movable between an open position and a closed position, according to one embodiment, the portion of the shutter being uncovered when the shutter keeper is in the open position, and the portion of the shutter being covered when the shutter keeper is in the closed position. The shutter keeper is one-piece with the housing in both the open position and the closed position. A securement, such as an ultrasonic weld, can be provided for securing the shutter keeper in the closed position. The shutter keeper can be bent to the housing along a side of the shutter keeper, and the shutter keeper can be of reduced thickness along said side. A data storage disk can be provided in combination with the cartridge assembly. The shutter can include a tab, the shutter keeper covering the tab. The shutter keeper further can define a recess, the tab being constructed and arranged to move within the recess as the shutter moves between the open and closed positions. The housing also can define a depression, the tab being constructed and arranged to move within the depression as the shutter moves between the open and closed positions.

Another aspect of the invention relates to a method of making a cartridge assembly for a data storage disk. The method includes molding a cartridge shell, the molded cartridge shell being one-piece with an outwardly projecting keeper. A shutter is placed in association with the cartridge shell, the shutter being slidable between an open position for exposing at least a portion of the data storage disk, and a closed position for covering at least a portion of the data storage disk. The method also includes moving the keeper over at least a portion of the shutter to retain the shutter in association with the cartridge shell. The movement of the keeper can include bending the keeper over the shutter portion. The method also can include molding a portion of the keeper to be thinner than another portion of the keeper, the keeper bending at the thinner portion. The method also can include securing the keeper in place over the shutter portion, for example, with ultrasonic welding. The method also can include maintaining the keeper as one-piece with the remainder of the cartridge shell while the keeper is secured in place over the shutter portion.

According to another aspect of the invention, a cartridge assembly for a data storage disk includes means for containing the data storage disk. The means for containing defines an opening to at least a portion of the data storage disk. The cartridge assembly also includes means for exposing at least a portion of the data storage disk. The means for exposing is supported by the means for containing, and is moveable between an open position for uncovering the opening in the means for containing to expose at least a portion of the data storage disk, and a closed position for covering the opening in the means for containing. The cartridge assembly also includes means for retaining the means for exposing in place with respect to the means for containing, the means for retaining being formed as one-piece with the means for containing and being disposed to cover at least a portion of the means for exposing to retain the means for exposing with respect to the means for containing. The means for retaining is movable between an open position and a closed position, the portion of the means for exposing being uncovered when the means for retaining is in the open position, and the portion of the means for exposing being covered when the means for retaining is in the closed position. The means for retaining is one-piece with the means for containing in both the open position and the closed position, according to an aspect of the invention. The cartridge assembly also can include means for securing the means for retaining in the closed position.

Other features and aspects according to embodiments of the invention will be apparent from the remainder of this disclosure.

DETAILED DESCRIPTION OF PREFERRED EMBODIMENTS

Figure 3:
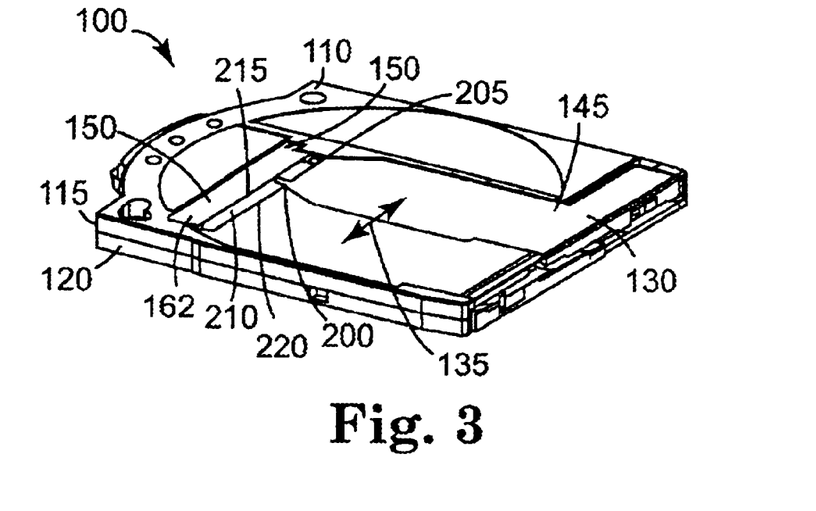
FIG. 3 is a perspective view of a data cartridge according to an embodiment of the invention.
Figure 4:
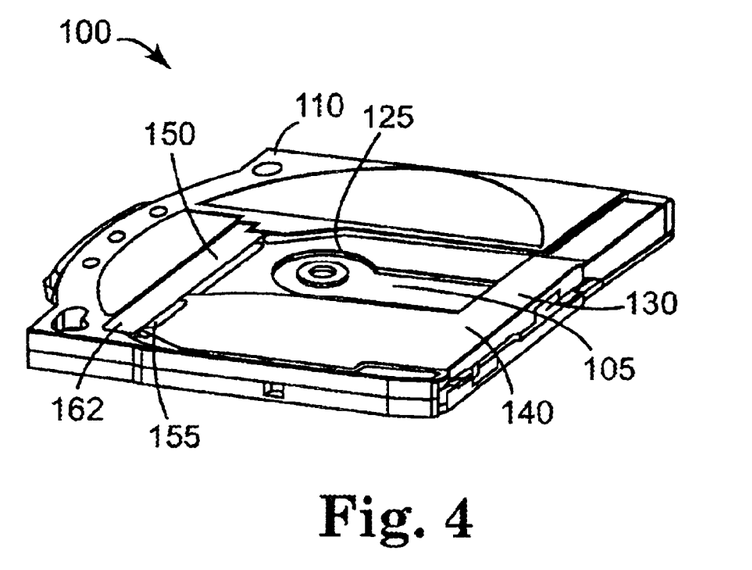
FIG. 4 is a perspective view of the FIG. 3 data cartridge in an alternative configuration.
Figures 5, 6:
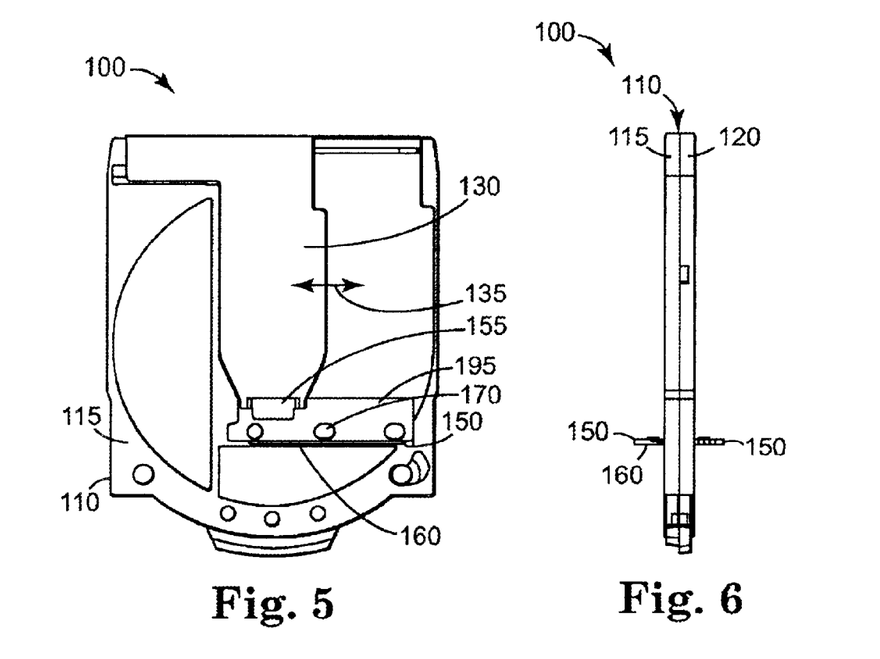
FIG. 5 is a top view of the FIG. 3 data cartridge.
FIG. 6 is a side view of the FIG. 3 data cartridge.
Figure 7:
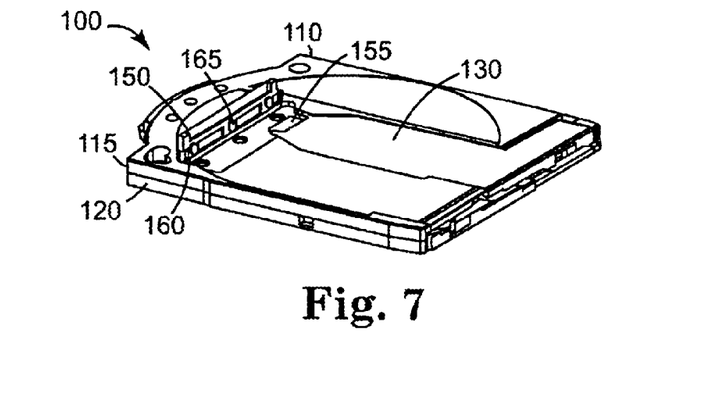
FIG. 7 is a perspective view of the FIG. 3 data cartridge in an alternative configuration.
Figure 8:
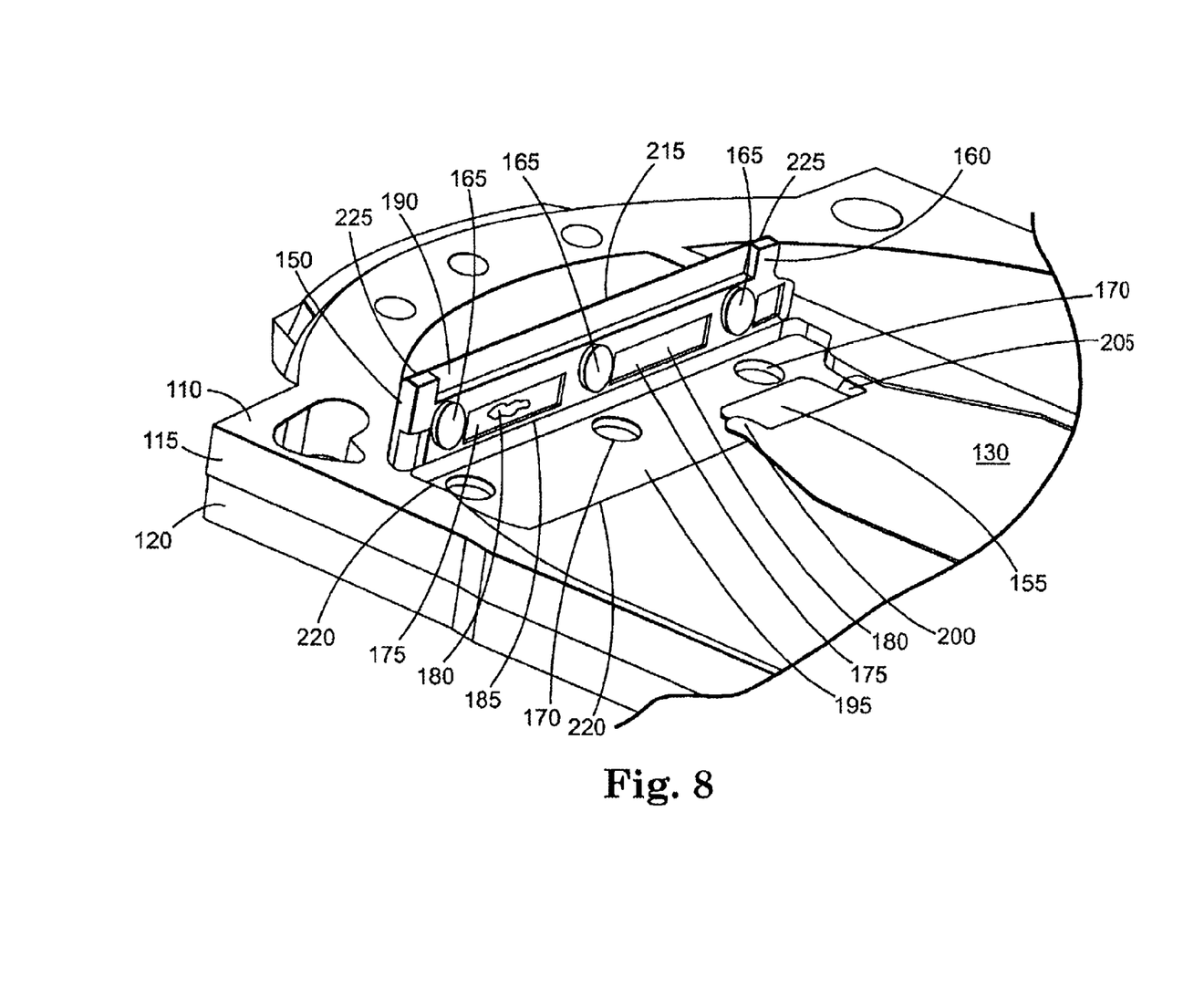
FIG. 8 is a close-up view of a portion of the FIG. 3 data cartridge.

FIGS. 3–8 illustrate a data cartridge embodiment according to the present invention. According to this embodiment, cartridge 100 includes housing 110 for containing information-containing media such as data storage disk 105 (FIG. 4). Housing 110 is composed of upper and lower housing members 115, 120, according to this embodiment, secured together in known fashion. Of course, housing 110 alternatively can include a single housing member, or more than two members, if desired. Housing 110 also defines opening 125 for exposing at least a portion of data storage disk 105 to, e.g., an optical head (not shown) or other component of an optical drive or other drive or device capable of reading and/or writing data to/from data storage disk 105. As will be appreciated by those of ordinary skill, data storage disk 105 can be used for various types of data storage, including data for computing devices such as personal computers, laptop computers, desktop computers, personal digital assistants and handheld devices, audio data, for example, music-data storage for MP3 players, photographic or video data for digital still cameras or digital video cameras, voice data, software, personal data, and other types of data and information.

Housing 110 supports shutter 130. Shutter 130 is movable, as represented by, e.g., arrows 135 in FIG. 3, between open position 140 (FIG. 4) and closed position 145 (FIG. 3). When in open position 140, shutter 130 uncovers opening 125 in housing 110 to expose at least a portion of data storage disk 105 to an optical head or similar device. When shutter 130 is in closed position 145, on the other hand, shutter 130 covers opening 125 in housing 110. Those of ordinary skill will appreciate that cartridge 100, housing 110, shutter 130 and the other components described herein can be of various selected dimensions. For example, a width of cartridge 100 can be, e.g., less than about 40 mm, and can range, e.g., from about 30 mm to about 37 mm. The length of cartridge 100 can be, e.g., less than about 42 mm, and can range, e.g., from about 30 mm to about 40 mm. The thickness of cartridge 100 can be, e.g., less than about 5 mm, and can range, e.g., from about 1 mm to about 3 mm. The entire cartridge 100 can have a mass of, e.g., less than about 7 gm, or, e.g., less than about 5 gm. Other possible dimensions according to the invention will be apparent to those of ordinary skill upon reading this disclosure.

Shutter keeper 150 is formed as one-piece with housing 110 and is constructed and arranged to cover at least a portion 155 of shutter 130. Shutter keeper 150 covers at least portion 155 of shutter 130 to retain shutter 130 with respect to housing 110. Shutter 130 is retained in association with housing 110 while it moves between open position 140 and closed position 145 to cover and uncover opening 125, as actuated by the drive or other mechanism into which cartridge 100 is inserted.

According to one embodiment, shutter keeper 150 is formed as one-piece with housing 110 by molding. More specifically, shutter keeper 150 is molded as one-piece with upper housing member 115 or lower housing member 120, or both. Note FIG. 6, for example, showing one shutter keeper 150 projecting outwardly as one-piece with housing member 115, and another shutter keeper 150 projecting outwardly as one-piece with housing member 120. To simplify the disclosure, only one keeper 150 is illustrated in the other drawings, but those of ordinary skill will appreciate that cartridge 100 can include one, two or more keepers 150 to suit a particular drive, need or environment. Upper and lower housing members 115, 120, and indeed the entire upper and lower sides of cartridge 100, can be generally identical according to embodiments of the invention. Additionally, those of ordinary skill will appreciate that the term "housing" can be interpreted to include a housing constructed of multiple housing members.

Housing members 115, 120, as well as keeper 150, can be made by injection molding of a thermoplastic material, for example, although other manufacturing techniques and other materials also are contemplated. For example, machining, stamping, punching or the like are contemplated to create each of the housing members 115, 120, and keeper 150, and materials such as aluminum or other metals, resins, ceramics, fiberglass, etc., also can be used. One or both of housing members 115, 120 can be formed of a translucent or transparent material, for example, a polycarbonate material, to better enable the use of ultraviolet-curable adhesives. Such adhesives can be cured by ultraviolet light at areas of direct exposure thereto, e.g., through the translucent or transparent material of housing members 115 and/or 120, to aid in securing housing members 115, 120 together. Shutter keeper 150 also can be constructed of a translucent or transparent material, to enable the use of ultraviolet-curable adhesives for use in securing keeper 150 in a closed position. Alternatively, as will be described, adhesive can be eliminated in favor of, e.g., ultrasonic welding.

Shutter keeper 150 is movable between open position 160, shown in, e.g., FIGS. 5–8, and closed position 162, illustrated in, e.g., FIGS. 3–4. According to one embodiment, shutter keeper 150 is molded in open position 160. As mentioned earlier, shutter 130 includes portion 155, which can be considered a tab, extension, or the like. Portion 155 is at least partially or entirely uncovered when shutter keeper 150 is in open position 160. Conversely, portion 155 of shutter 130 is at least partially or entirely covered when shutter keeper 150 is in closed position 162. As will be evident upon reading this disclosure, shutter keeper 150 is one-piece with housing 110 (and/or one or both of housing members 115, 120) in both open position 160 and closed position 162.

Molding or otherwise forming shutter keeper 150 as one-piece with housing 110, housing member 115, and/or housing member 120 provides a number of advantages. One-piece construction reduces or eliminates the operational complexities associated with, e.g., feeding multiple shutter keepers 150 to a pick-up station, determining a correct color of shutter keeper, picking shutter keeper 150 up, orienting it, moving it and finally placing it into precise association with housing 110. In the case where cartridge 100 includes two shutter members 130, two separate component parts are eliminated and instead are included in the housing or housing member. A separate molding station or run for producing those components also is eliminated. Embodiments of the invention thus reduce cycle times and reduce costs. Efficiencies and quality are improved.

According to one embodiment, cartridge 100 includes at least one securement for securing shutter keeper 150 in closed position 162. One such securement is in the form of one or more posts or protrusions 165, which are constructed and arranged to fit into corresponding recesses 170 in, e.g., housing member 115 of housing 110. Although three such securement combinations 165, 170 are illustrated in, e.g., FIGS. 7–8, any number of combinations is contemplated. Additionally, keeper 150 and/or housing member 115 can include one or more optional recesses 175 for accommodating glue 180 or other adhesive. Such adhesive thus is another example of securement according to the invention, and can include one or more ultraviolet-curable adhesives. One advantage of an ultraviolet-curable adhesive is that "tacking" of keeper 150 with respect to housing 110 can occur prior to final oven cure, to prevent or minimize the likelihood of unwanted movement of keeper 150 with respect to housing 110. Alternatively, adhesive can be eliminated entirely, and ultrasonic welding used to secure keeper 150 in its closed position 162. Eliminating adhesive can improve manufacturing speeds, improve quality and reduce costs. Whatever securement is used, particulate or other contamination concerns are reduced when cartridge 100 is assembled in half-shell form, i.e. when housing members 115, 120 are separately assembled with respective shutters 130 and keepers 150, before data storage disk or other media 105 is introduced.

According to one embodiment, keeper 150 is moved from open position 160 to closed position 162 by bending keeper 150 along side 185 thereof. Shutter keeper 150 can be of reduced thickness along side 185 or other area of bending, to promote flexibility and minimize the amount of pressure that must be applied for bending to occur. For example, whereas the overall thickness of keeper 150 can be about 0.48 mm, the reduced thickness along side 185 can be, e.g., about 0.09 mm. Other dimensions are contemplated. Those of ordinary skill will appreciate that a tool or other automated or manual device can be used to bend or otherwise move keeper 150 to closed position 162. Those of ordinary skill will also appreciate that keeper 150 can be constructed to project from housing 110 at a leftmost or rightmost (as viewed in FIG. 8) end of keeper 150 instead of along side 185.

According to one embodiment, shutter keeper 150 defines recess 190. Tab or other portion 155 of shutter 130 is constructed and arranged to move within recess 190, when keeper 150 is in closed position 162, as shutter 130 moves between its open position 140 and its closed position 145. Those of ordinary skill will appreciate that forming keeper 150 in an outwardly projecting configuration, as illustrated in, e.g., FIG. 6, allows easy formation of, e.g., recess 190 during a molding process, because the associated mold can pull away from recess 190. Further, housing 110 defines depression 195 according to this embodiment. Tab or other portion 155 of shutter 130 is constructed and arranged to move within depression 195 as shutter 130 moves between its open position 140 and closed position 145. When shutter keeper 150 is in its closed position 162, therefore, tab 155 moves simultaneously within recess 190 and depression 195, each of which provide sufficient clearance so that contact between tab 155 and any other component is reduced to avoid particle generation and other issues. Shutter keeper 150 holds or maintains shutter 130 in place both horizontally and vertically with respect to, e.g., housing member 110.

Other structural details according to embodiments of the invention will be apparent from the figures. For example, shutter 130 defines two projecting end portions 200, 205 for bordering tab 155. As also will be apparent, end portions 200, 205 move within gap 210 created between edge 215 of keeper 150 and edge 220 of depression 195. Further, the upper surfaces 225 of the left and right ends of shutter keeper 150, as viewed in, e.g., FIG. 8, can lie flush with edge 220 of depression 195 when keeper 150 is in its closed position, such that housing portion 110 defines a generally planar upper surface and/or a generally planar continuous surface including an upper portion of shutter keeper 150. As also will be appreciated, tab 155 lies below the plane of end portions 200, 205 and/or the remainder of shutter 130, as illustrated in, e.g., FIG. 8.

According to a method embodiment of the invention, one or more of housing members 110 is a cartridge shell that is molded as one-piece with one or more outwardly projecting keepers 150. Shutter 130 is placed in association with the cartridge shell, the shutter being slidable between open position 140 and closed position 145, generally in the manner described earlier. Keeper 150 is moved, for example, by bending, over at least portion 155 of shutter 130 to retain shutter 130 in association with the cartridge shell. Edge or side 185 of keeper 150 can be molded to be thinner than another portion of keeper 150, for example, the remainder of keeper 150, to promote bending. Keeper 150 can be secured in its closed position 162 over shutter portion 155 with adhesive, mechanical connection, ultrasonic welding, and/or other methods. According to one embodiment, keeper 150 is maintained as one-piece with the remainder of the cartridge shell, e.g., with housing member 110, while keeper 150 is secured in place over shutter portion 155. According to another embodiment, keeper 150 is separated from the remainder of the cartridge shell, e.g., before securement.

Moreover, according to another embodiment of the present invention, housing 110 functions to contain data storage disk 105. Shutter 130 functions to expose at least a portion of data storage disk 105, as needed and/or as actuated by a drive into which cartridge 100 is inserted. Shutter keeper 150 acts to retain shutter 130, which acts as means for exposing, in place with respect to housing 110, which acts as means for containing. Of course, various structural equivalents to the elements illustrated and described herein will be apparent to those of ordinary skill upon reading this disclosure.

Although the present invention has been described with respect to certain embodiments, those skilled in the art will recognize that changes can be made in form and detail without departing from the spirit and scope of the invention. For example, a wide variety of data storage devices can be used according to the invention. Embodiments of the invention disclosed with respect to one housing member, for example, housing member 115, are also equally applicable to the other housing member, e.g., housing member 120, or to a one-piece housing. The term "assembly" should be understood to refer to the entire data cartridge or merely a portion of the data cartridge, for example, a portion of the data cartridge supported by or including just one of the two illustrated housing members. The term "to cover" should be understood to include entirely covering a structure or only partially covering it. Finally, it should be understood that directional terminology, such as upper, lower, left, and right, is used for purposes of illustration and description only, and is not intended necessarily to be limiting. Other modifications and changes will be apparent to those of ordinary skill.

What is claimed is:

1. A cartridge assembly for a data storage disk, the cartridge assembly comprising:
    a housing for containing the data storage disk, the housing defining an opening for exposing at least a portion of the data storage disk;
    a shutter supported by the housing, the shutter being movable between a first position for uncovering the opening in the housing to expose at least a portion of the data storage disk and a second position for covering the opening in the housing; and
    a shutter keeper, formed as one-piece with the housing, for covering at least a portion of the shutter to retain the shutter with respect to the housing;
    wherein the shutter keeper is bent to the housing along a side of the shutter keeper.

2. The cartridge assembly of claim 1, wherein the shutter keeper is molded as one-piece with the housing.

3. The cartridge assembly of claim 1, wherein the shutter keeper is movable between an open position and a closed position, said portion of the shutter being uncovered when the shutter keeper is in the open position, and said portion of the shutter being covered when the shutter keeper is in the closed position; further wherein the shutter keeper is one-piece with the housing in both the open position and the closed position.

4. The cartridge assembly of claim 3, further comprising a securement for securing the shutter keeper in the closed position.

5. The cartridge assembly of claim 4, wherein the securement comprises an ultrasonic weld.

6. The cartridge assembly of claim 1, wherein the shutter keeper is of reduced thickness along said side.

7. The cartridge assembly of claim 1, in combination with a data storage disk disposed within the housing.

8. The cartridge assembly of claim 1, wherein the shutter comprises a tab, the shutter keeper being constructed to at least partially cover the tab.

9. The cartridge assembly of claim 8, wherein the shutter keeper defines a recess, the tab being constructed and arranged to move within the recess as the shutter moves between the first and second positions.

10. The cartridge assembly of claim 9, wherein the housing defines a depression, the tab being constructed and arranged to move within the depression as the shutter moves between the first and second positions.

11. The cartridge assembly of claim 9, wherein the recess is defined in the shutter keeper, the tab being constructed and arranged to move within the recess in the shutter keeper as the shutter moves between the first and second positions.

12. The cartridge assembly of claim 1, wherein the shutter keeper is movable from an open position to a closed position, the shutter keeper being one-piece with the housing in both the open position and the closed position.

13. The cartridge assembly of claim 1, wherein the shutter keeper defines a further recess for accommodating adhesive to secure the shutter keeper with respect to the housing.

14. The cartridge assembly of claim 1, wherein the housing defines recesses, further wherein the shutter keeper defines protrusions constructed and arranged to fit into the recesses for securing the shutter keeper with respect to the housing.

15. A cartridge assembly for a data storage disk, the cartridge assembly comprising:
    means for containing the data storage disk, the means for containing defining an opening to at least a portion of the data storage disk;
    means for exposing at least a portion of the data storage disk, the means for exposing being supported by the means for containing, the means for exposing being movable between a first position for uncovering the opening in the means for containing to expose at least a portion of the data storage disk and a second position for covering the opening in the means for containing; and
    means for retaining the means for exposing in place with respect to the means for containing, the means for retaining being formed as one-piece with the means for containing and being disposed to cover at least a portion of the means for exposing to retain the means for exposing with respect to the means for containing;
    wherein the means for retaining is movable between an open position and a closed position, said portion of the means for exposing being uncovered when the means for retaining is in the open position, and said portion of the means for exposing being covered when the means for retaining is in the closed position; further wherein the means for retaining is one-piece with the means for containing in both the open position and the closed position.

16. The cartridge assembly of claim 15, further comprising means for securing the means for retaining in the closed position.

17. The cartridge assembly of claim 15, wherein the means for retaining is bent to the means for containing along a side of the means for retaining.

18. A cartridge assembly for a data storage disk, the cartridge assembly comprising:

a housing for containing the data storage disk, the housing defining an opening for exposing at least a portion of the data storage disk;

a shutter supported by the housing, the shutter being movable between a first position for uncovering the opening in the housing to expose at least a portion of the data storage disk and a second position for covering the opening in the housing; and a shutter keeper, formed as one-piece with the housing, for covering at least a portion of the shutter to retain the shutter with respect to the housing;

wherein the shutter keeper is of reduced thickness along a side of the shutter keeper.

19. A cartridge assembly for a data storage disk, the cartridge assembly comprising:

a housing for containing the data storage disk, the housing defining an opening for exposing at least a portion of the data storage disk;

a shutter supported by the housing, the shutter being movable between a first position for uncovering the opening in the housing to expose at least a portion of the data storage disk and a second position for covering the opening in the housing; and a shutter keeper, formed as one-piece with the housing, for covering at least a portion of the shutter to retain the shutter with respect to the housing;

wherein the shutter keeper defines a further recess for accommodating adhesive to secure the shutter keeper with respect to the housing.

20. A cartridge assembly for a data storage disk, the cartridge assembly comprising:

a housing for containing the data storage disk, the housing defining an opening for exposing at least a portion of the data storage disk;

a shutter supported by the housing, the shutter being movable between a first position for uncovering the opening in the housing to expose at least a portion of the data storage disk and a second position for covering the opening in the housing; and a shutter keeper, formed as one-piece with the housing, for covering at least a portion of the shutter to retain the shutter with respect to the housing; wherein the housing defines recesses, further wherein the shutter keeper defines protrusions constructed and arranged to fit into the recesses for securing the shutter keeper with respect to the housing.

* * * * *